(12) United States Patent
Asahara

(10) Patent No.: US 8,386,176 B2
(45) Date of Patent: Feb. 26, 2013

(54) VEHICLE POSITION TRANSMISSION SYSTEM, VEHICLE, AND VEHICLE POSITION TRANSMISSION PROGRAM

(75) Inventor: Nobuaki Asahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/867,966

(22) PCT Filed: Jan. 9, 2009

(86) PCT No.: PCT/JP2009/000075
§ 371 (c)(1),
(2), (4) Date: Aug. 17, 2010

(87) PCT Pub. No.: WO2009/122632
PCT Pub. Date: Oct. 8, 2009

(65) Prior Publication Data
US 2011/0015820 A1    Jan. 20, 2011

(30) Foreign Application Priority Data
Mar. 31, 2008   (JP) .................. 2008-090041

(51) Int. Cl.
*G08G 1/123* (2006.01)
*B60R 25/10* (2006.01)
*G01C 21/00* (2006.01)
(52) U.S. Cl. ......... 701/517; 701/468; 340/428; 713/323
(58) Field of Classification Search .......... 701/2, 36, 701/200, 207, 213, 517, 519, 521, 484, 468; 455/574, 456.1; 340/426.19, 438, 989, 426.1, 340/428; 713/300, 320, 323, 324
See application file for complete search history.

(56) References Cited

U.S. PATENT DOCUMENTS 6,282,495 B1 *  8/2001  Kirkhart et al. ............... 701/213
(Continued)

FOREIGN PATENT DOCUMENTS

| JP | 09-147291 A | 6/1997 |
|---|---|---|
| JP | 11-344422 A | 12/1999 |

(Continued)

OTHER PUBLICATIONS

Chinese Office Action dated Aug. 3, 2012.

*Primary Examiner* — Christine Behncke
(74) *Attorney, Agent, or Firm* — Arent Fox LLP

(57) ABSTRACT

A system and the like capable of reporting a position of a vehicle to outside at an appropriate frequency, while saving communication cost is provided. According to a vehicle position transmission system 10 of the present invention, after an IGN switch 101 of a vehicle 1 is switched from ON to OFF, the vehicle position transmission system 10 is transited from an operating state to a stand-by state. Then, in the case where a transition requirement of the vehicle position transmission system 10 to a sleeping state is satisfied, a wireless communication equipment 14 transmits a position signal to a vehicle management center 2, and thereafter a vehicle position transmission system 10 is transited to the sleeping state.

3 Claims, 3 Drawing Sheets

U.S. PATENT DOCUMENTS

| | | |
|---|---|---|
| 6,285,931 B1 | 9/2001 | Hattori et al. |
| 6,766,246 B2 * | 7/2004 | Mutoh ............................ 701/207 |
| 7,610,035 B2 * | 10/2009 | Van Bosch et al. ......... 455/343.2 |
| 2004/0127206 A1 | 7/2004 | Van Bosch et al. |
| 2006/0205445 A1 * | 9/2006 | Sakaniwa et al. .............. 455/574 |
| 2007/0099678 A1 * | 5/2007 | Kim et al. ...................... 455/574 |
| 2008/0008510 A1 * | 1/2008 | Lee et al. ....................... 399/411 |
| 2009/0093920 A1 * | 4/2009 | Kane et al. ....................... 701/19 |

FOREIGN PATENT DOCUMENTS

| | | |
|---|---|---|
| JP | 2001-236597 A | 8/2001 |
| JP | 2004-054600 A | 2/2004 |
| JP | 2006-145442 A | 6/2006 |
| JP | 2007-255185 A | 10/2007 |
| JP | 2007-310892 A | 11/2007 |
| WO | WO 00/55827 A1 | 9/2000 |

\* cited by examiner

VEHICLE POSITION TRANSMISSION SYSTEM, VEHICLE, AND VEHICLE POSITION TRANSMISSION PROGRAM

CROSS-REFERENCED TO RELATED APPLICATION

This is application is a National Stage entry of International Application No. PCT/JP2009/000075, filed Jan. 9, 2009, which claims priority to Japanese Patent Application 2008-090041, filed Mar. 31, 2008. The disclosure of the prior application is hereby incorporated in its entirety by reference.

BACKGROUND OF THE INVENTION

1. Technical Field

The present invention relates to a system and the like for reporting a position of a vehicle to outside using a wireless communication equipment mounted on the vehicle.

2. Description of the Related Art

There is proposed a technique of reporting a position of a vehicle to outside according to parking which is speculated from stopping of the engine and the like, or request from outside and the like from a viewpoint of preventing vehicle theft and the like (refer to Japanese Patent Laid-Open No. 2006-145442, Japanese Patent Laid-Open No. 2004-054600, and Japanese Patent Laid-Open No. 2001-236597).

However, if the position of the vehicle is reported to outside each time the engine is stopped, cost of communication for reporting is accumulated according to the number of times the engine is stopped.

2 SUMMARY OF THE INVENTION

In view of the above circumstances, an object to be solved by the present invention is to provide a system and the like capable of reporting the position of the vehicle to outside at an appropriate frequency, while saving the communication cost.

In order to achieve the object mentioned above, a vehicle position transmission system of a first aspect of the invention is a vehicle position transmission system mounted on a vehicle, and comprises: a wireless communication equipment; a position measuring unit which measures a position of the vehicle; and a state controlling unit which controls the vehicle position transmission system to a stand-by state in which the wireless communication equipment is capable of communicating with an outside equipment on condition that an ignition switch or an accessory switch of the vehicle is switched from ON to OFF, and which transits the vehicle position transmission system from the stand-by state to a sleeping state after making the wireless communication equipment transmit the position signal to the outside equipment, on condition that a transition condition of the vehicle position transmission system to the sleeping state in which the wireless communication equipment is incapable of communicating with the outside equipment is satisfied.

According to the vehicle position transmission system of the first aspect of the invention, the vehicle position transmission system is controlled to the stand-by state after the ignition switch or the accessory switch of the vehicle is switched from ON to OFF. Then, on condition that the transition requirement of the vehicle position transmission system to the sleeping state is satisfied, the wireless communication equipment transmits the position signal to the outside equipment, and thereafter a vehicle position transmission system is transited from the stand-by state to the sleeping state. That is, the vehicle state reporting system in the stand-by state makes use of the last chance before transiting to the sleeping state, and transmits the position signal by the wireless communication equipment to the outside equipment. By doing so, compared to the case where the position signal is transmitted to the outside equipment on sole condition that the ignition switch or the accessory switch is switched from ON to OFF, the transmission frequency of the position signal is suppressed low. Therefore, it becomes possible to transmit the position of the vehicle to outside at an appropriate frequency, while saving the communication cost.

Here, the term a component of the present invention "recognizes" information means that the component performs all possible information processing necessary for preparing or providing information for further information processing, such as the component receives the piece of information input from outside; searches the piece of information in an database; retrieves the piece of information from a memory device; measures, calculates, estimates, determines the piece of information or the like on the basis of the output signals from sensors or the like; and stores in memory the piece of measured information or the like.

The vehicle position transmission system of a second aspect of the invention is the vehicle position transmission system of the first aspect of the invention, wherein the state controlling unit recognizes a power supply ability of a power source which supplies power to the vehicle position transmission system, and sets the transition requirement of the vehicle position transmission system to the sleeping state on the basis of the power supply ability of the power source.

According to the vehicle position transmission system of the second aspect of the invention, the timing of the vehicle position transmission system transiting to the sleeping state is adjusted, on the basis of the power supply ability of the power source of the vehicle position transmission system. By doing so, it becomes possible to report the position of the vehicle to outside at an appropriate frequency from the viewpoint of effective utilization of the power supply ability of the power source and the saving of the consumed power by the vehicle position transmission system, while saving the communication cost.

A vehicle of a third aspect of the invention is equipped with the vehicle position transmission system of the first aspect of the invention.

According to the vehicle of the third aspect of the invention, it becomes possible to report the position of the vehicle to outside at an appropriate frequency, while saving the communication cost, using the wireless communication equipment mounted on the vehicle.

A vehicle position transmission program of a fourth aspect of the invention makes a computer mounted on a vehicle with a wireless communication equipment to function as the vehicle position transmission system according to the first aspect of the invention.

According to the vehicle position transmission program of the fourth aspect of the invention, it becomes possible to make the computer mounted on the vehicle to function as the system for reporting the position of the vehicle to outside at an appropriate frequency, while saving the communication cost.

DETAILED DESCRIPTION OF THE PREFERRED EMBODIMENTS

Figure 1:
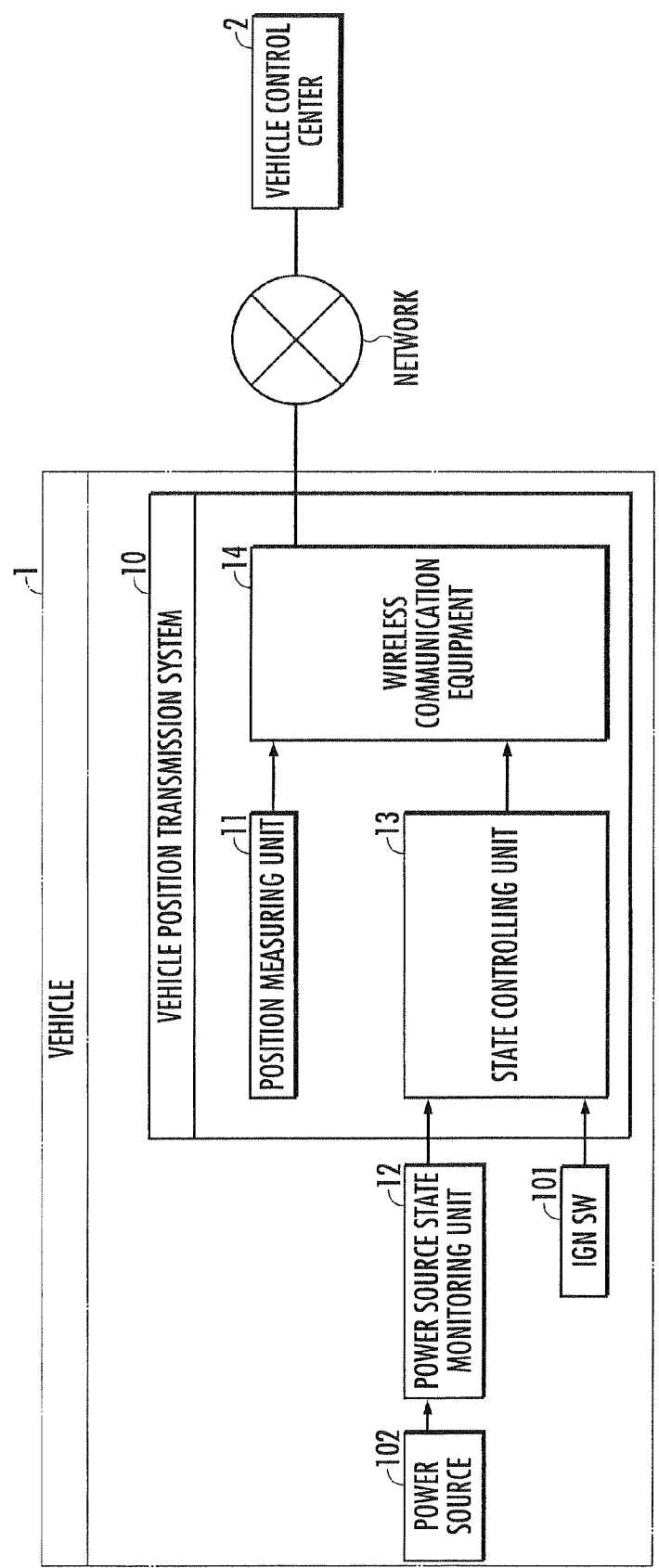
FIG. 1 is an explanatory view of a configuration of a vehicle and a vehicle position transmission system.

An embodiment of a vehicle position transmission system and the like of the present invention will now be explained below with reference to accompanying drawings. A vehicle (four-wheel vehicle) 1 shown in FIG. 1 is equipped with an IGN (ignition) switch 101, a power source 102, a vehicle position transmission system 10, and a power source state monitoring unit 12 for measuring a power supply ability of the power source 102. The switching between ON and OFF of the IGN switch 101 initiates the switching of the state of the vehicle position transmission system 10 as will be explained later. In place of the IGN switch 101, the switching between ON and OFF of an ACC (accessory) switch may initiate the switching of the state of the vehicle position transmission system 10. The power source 102 supplies electric power to vehicle equipments such as the vehicle position transmission system 10 appropriately via a converter or a voltage adjustment unit. A battery, a capacitor or a secondary battery, or a combination of the same, is mounted as the power source 102 on the vehicle 1. The vehicle position transmission system 10 is configured from a computer or an electronic control unit (configured from a CPU, a ROM, a RAM, an I/O and the like). A vehicle position transmission program for making the computer function as the above-described system is stored in a memory of the computer configuring the vehicle position transmission system 10. The vehicle position transmission program may preliminary be stored in the memory, but may be installed to the computer via a recording medium such as a CD-ROM, or may be stored in the memory after receiving the same which is delivered or broadcasted from a server with a wireless communication equipment 14.

Figure 3:
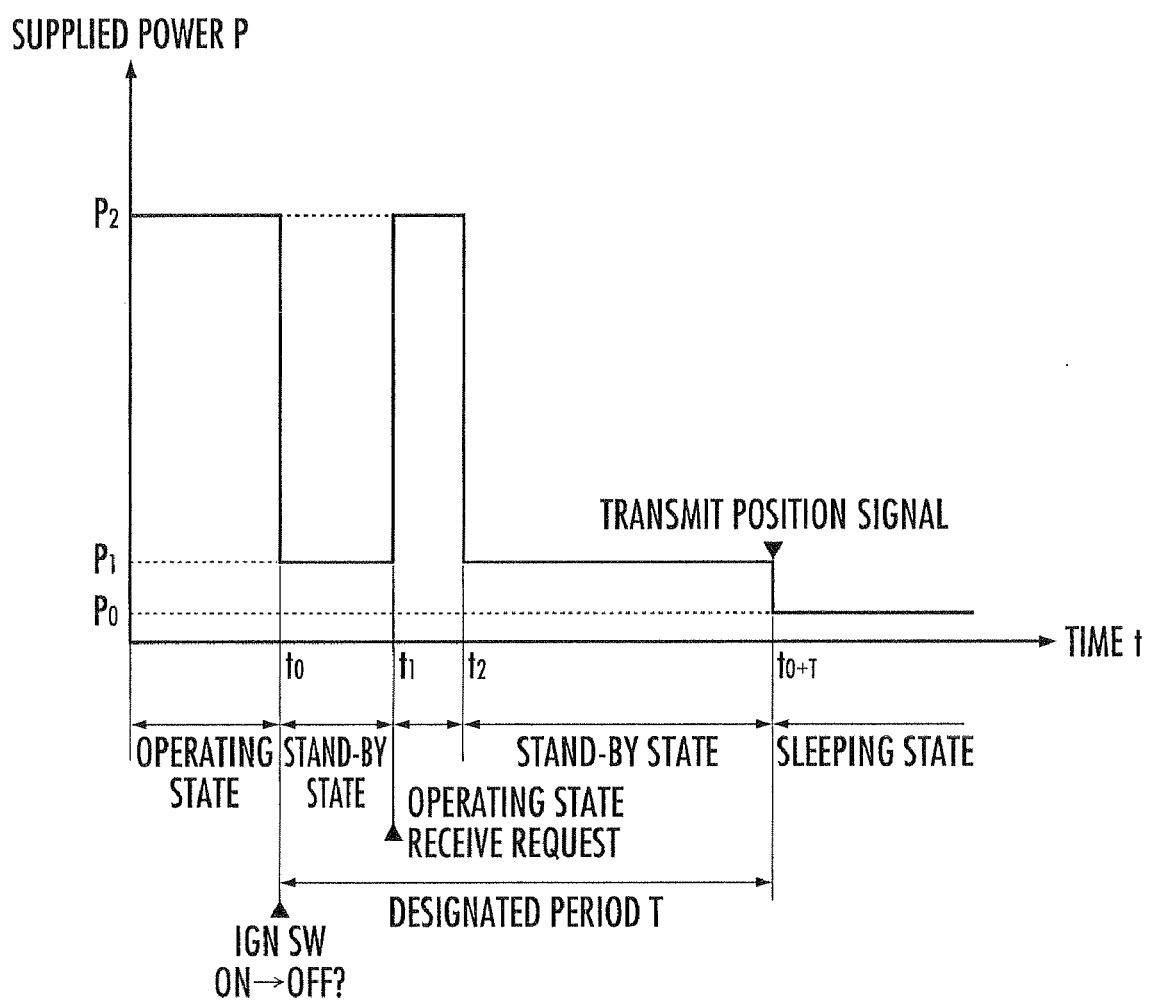
FIG. 3 is an explanatory view of a state transition and consumed power of the vehicle position transmission system.

The vehicle position transmission system 10 is equipped with a position measuring unit 11, a state controlling unit 13, and the wireless communication equipment 14. The position measuring unit 11 measures the position of the vehicle 1. The wireless communication equipment 14 transmits a position signal indicating the position of the vehicle 1 measured by the position measuring unit 11 to a vehicle management center 2. The wireless communication equipment 14 may be mounted on the vehicle 1 independent of the electronic control unit constituting the vehicle position transmission system 10. Further, a portable-type communication equipment such as a cellular phone which is inserted to a cradle provided to the interior space of the vehicle 1 may be mounted on the vehicle 1 as the wireless communication equipment 14. The state controlling unit 13 controls the vehicle position transmission system 10 to either one state selected from "operating state", "stand-by state", and "sleeping state" as will be explained later, after recognizing the power supply ability of the power source 102 by receiving signals indicating the measurement result from the power source state monitoring unit 12. The "operating state" is a state in which the operation of the wireless communication equipment 14 and other equipment group (which includes door lock device, window opening-closing device, air-conditioning device and the like) mounted on the vehicle 1 is capable of being controlled. The "stand-by state" is a state in which the operation of the other equipment group is incapable of being controlled, but the wireless communication equipment 14 is capable of communicating with the outside equipment. The "sleeping state" is a state in which the operation of the other equipment group is incapable of being controlled, and the wireless communication equipment 14 is incapable of communicating with the outside equipment. As is shown in FIG. 3, the magnitude relationship between supplied power $P_0$, $P_1$ and $P_2$, in the sleeping state, the stand-by state and the operating state, respectively, of the vehicle position transmission system 10 from the power source 102 to the vehicle position transmission system 10 is expressed by the following relational expression (1). The sleeping state, the stand-by state and the operating state of the vehicle position transmission system 10 may be sectionalized by the level of the output power of the power source 102, the supplied power from the power source 102 to the vehicle position transmission system 10, or the consumed power by the vehicle position transmission system 10.

$$P_0 < P_1 < P_2 \tag{1}$$

Figure 2:
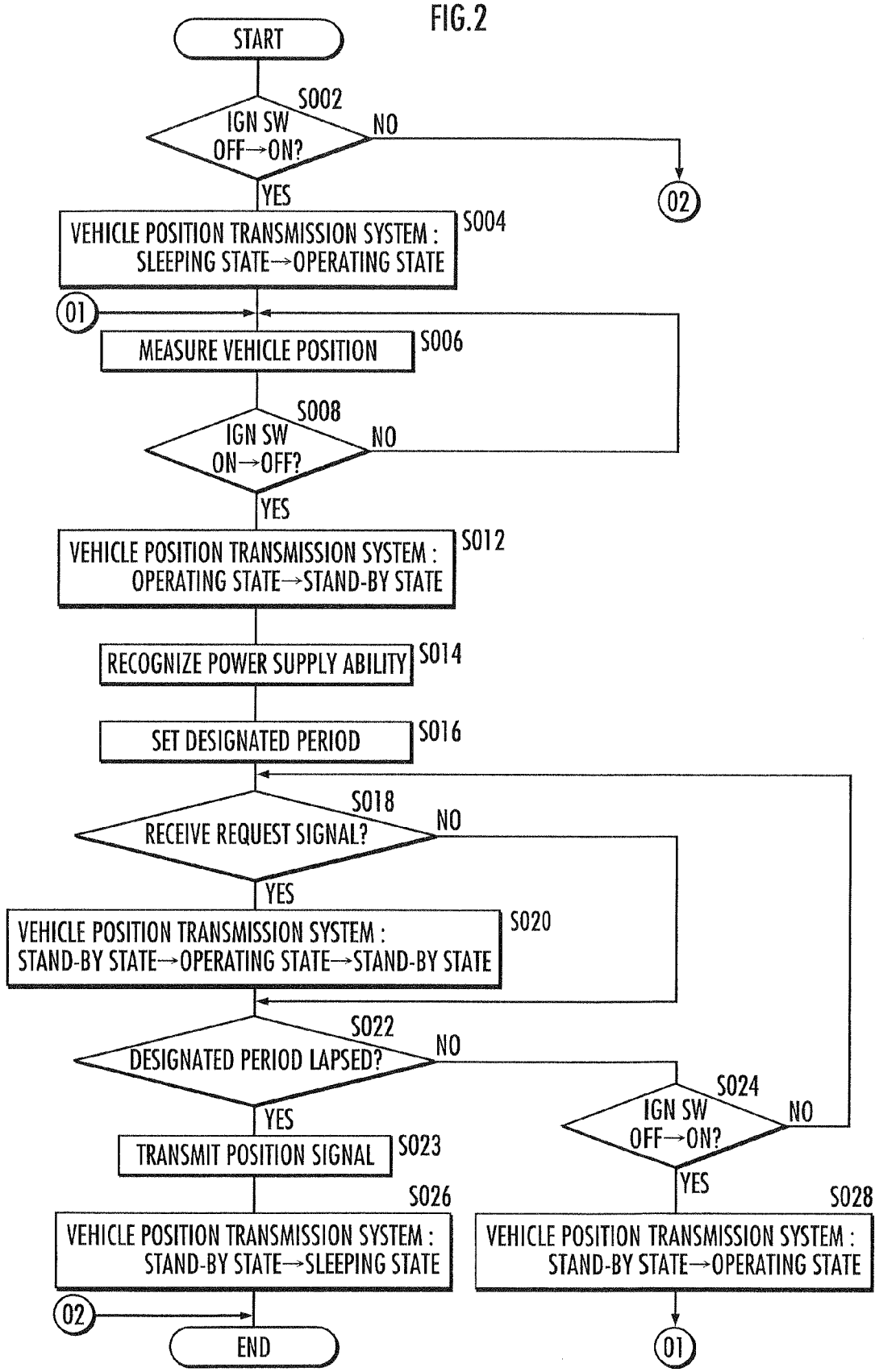
FIG. 2 is a flowchart showing a function of the vehicle position transmission system.

Next, explanation will be given on the function of the vehicle position transmission system 10 with the above-mentioned configuration. When the IGN switch 101 of the vehicle 1 is switched from OFF to ON (FIG. 2/S002 . . . YES), the state controlling unit 13 transits the vehicle position transmission system 10 from the sleeping state to the operating state (FIG. 2/S004). By doing so, as is shown in FIG. 3, the supplied power P from the power source 102 to the vehicle position transmission system 10 is controlled to a second power $P_2$. Also, the position measuring unit 11 measures the position of the vehicle 1 (FIG. 2/S006). Specifically, the position ((latitude, longitude) or (latitude, longitude, height)) of the vehicle 1 is sequentially measured on the basis of the GPS signal received by the GPC receiver, output signals from the acceleration sensor and the gyro sensor or the like, or the combination of these.

Thereafter, when the IGN switch 101 is switched from ON to OFF (FIG. 2/S008 . . . YES), the state controlling unit 13 transits the vehicle position transmission system 10 from the operating state to the stand-by state (FIG. 2/S012). By doing so, as is shown in FIG. 3, the supplied power P from the power source 102 to the vehicle position transmission system 10 from time $t_0$ is controlled to a first power $P_1$ ($<P_2$). Further, the power source state monitoring unit 12 measures or evaluates the power supply ability of the power source 102, and the state controlling unit 13 recognizes the power supply ability of the power source 102, by receiving the signal indicating the measurement result from the power source state monitoring unit 12 (FIG. 2/S014). Specifically, a SOC (state of charge) of the power source 102 is measured as the power supply ability. In the case where a fuel cell is mounted on the vehicle 1 and the power source 102 is charged by the operation of the fuel cell, the power supply ability may be given comprehensive evaluation by taking into consideration the remaining amount of the fuel such as a hydrogen gas. In this case, the power supply ability may be given comprehensive evaluation by further taking into consideration a predicted consumed power by a pump which supplies fuel to the fuel cell. Further, the state controlling unit 13 sets a designated period T to be shorter in a stepwise fashion or continuously, as the power supply ability of the power source 102 becomes lower (FIG. 2/S016).

Thereafter, when the vehicle position transmission system 10 is in the stand-by state, it is determined whether or not there is an operation request for the in-vehicle equipments, that is, whether or not a request signal from the vehicle management center 2 or other outside equipment is received by the wireless communication equipment 14 (FIG. 2/S018). In the case where it is determined that the request is made (FIG. 2/S018 . . . YES), then as is shown in FIG. 3, after the state controlling unit 13 temporarily transits the vehicle position transmission system 10 from the stand-by state to the operating state at time $t_1$, the vehicle position transmission system 10 is returned to the stand-by state at time $t_2$ (FIG. 2/S020). During the time when the vehicle position transmission system 10 is temporary transited to the operating state, the operation of the target equipment is controlled in accordance with the request, such as locking or unlocking of the door, opening and closing of the window, or the starting or stopping of the operation of the air-conditioner and the like. The position signal may be transmitted by the wireless communication equipment 14 to the vehicle management center 2 in accordance with the request while the vehicle position transmission system 10 is maintained in the stand-by state. On the basis thereof, the fulfillment of a transition requirement of the vehicle position transmission system 10 to the sleeping state, that the designated period T lapsed while the IGN switch 101 is continuously switched from ON to OFF, is determined (FIG. 2/S022). The fact that the designated period T lapsed while the vehicle position transmission system 10 is maintained transited from the operating state to the stand-by state may be adopted as the transition requirement of the vehicle position transmission system 10.

On the other hand, in the case where it is determined that there is no such request (FIG. 2/S018 . . . NO), then it is determined whether or not the designated period T lapsed while the vehicle position transmission system 10 is maintained in the stand-by state (FIG. 2/S022). In the case where it is determined that the designated period T lapsed (FIG. 2/S022 . . . YES), then the position signal representing the position of the vehicle 1 at that point in time is transmitted by the wireless communication equipment 14 to the vehicle management center 2 (FIG. 2/S023). Further, the state controlling unit 13 switches the vehicle position transmission system 10 from the stand-by state to the sleeping state (FIG. 2/S026). In addition to or in place of the lapse of the designated period T, the fact that the amount of change of the power supply ability that is measured by the power source state monitoring unit 12 reaches a threshold value may be used as the transition requirement of the vehicle position transmission system 10 to the sleeping state. By doing so, as is shown in FIG. 3, the supplied power P from the power source 102 to the vehicle position transmission system 10 from the time $t_0+T$ is controlled to a reference power $P_0$ (substantially 0). On the other hand, in the case where it is determined that the designated period T had not lapsed (FIG. 2/S022 . . . NO), then it is determined whether or not the IGN switch 101 is switched from OFF to ON (FIG. 2/S024). In the case where it is determined that the IGN switch 101 is switched from OFF to ON (FIG. 2/S024 . . . YES), then the state controlling unit 13 transits the vehicle position transmission system 10 from the stand-by state to the operating state (FIG. 2/S028), and the process after the position measurement of the vehicle 1 is executed as is explained above (refer to FIG. 2/S006). In the case where it is determined that the IGN switch 101 is maintained OFF (FIG. 2/S024 . . . NO), then the process after determination on whether or not a request signal is received is repeated as is explained above (refer to FIG. 2/S016 and the like).

According to the vehicle position transmission system 10 exerting the above-mentioned functions, after the IGN switch 101 of the vehicle 1 is switched from ON to OFF, the vehicle position transmission system 10 is transited from the operating state to the stand-by state (refer to FIG. 2/S008 . . . YES, S012, FIG. 3/time $t_0$). Thereafter, on condition that the designated period T lapsed during when the IGN switch is switched from ON to OFF, that is, on condition that the transition requirement of the vehicle position transmission system 10 to the sleeping state is satisfied, the position signal is transmitted by the wireless communication equipment 14 to the vehicle management center 2, and thereafter a vehicle state reporting system 10 is transited to the sleeping state (refer to FIG. 2/S022 . . . YES, S023, FIG. 3/time $t_0+T$). That is, the vehicle position transmission system 10 in the stand-by state makes use of the last chance before transiting to the sleeping state, and transmits the position signal by the wireless communication equipment 14 to the vehicle management center 2. By doing so, compared to the case where the position signal is transmitted to the outside equipment such as the vehicle management center 2 on sole condition that the IGN switch 101 is switched from ON to OFF, the transmission frequency of the position signal is suppressed low. Further, as the power supply ability of the power source 102 measured by the power source state monitoring unit 12 and recognized by the state controlling unit 13 is lower, the designated period T is set to be shorter in a stepwise fashion or continuously, so that the timing of the vehicle position transmission system 10 transiting to the sleeping state is accelerated (refer to FIG. 2/S014, S016, FIG. 3/time $t_0+T$). By doing so, it becomes possible to transmit the position of the vehicle 1 to outside at an appropriate frequency from the viewpoint of effective utilization of the power supply ability of the power source 102 and the saving of the consumed power by the vehicle position transmission system 10, while saving the communication cost.

The invention claimed is:

1. A vehicle position transmission system mounted on a vehicle, comprising:
 a wireless communication equipment;
 a position measuring unit which measures a position of the vehicle; and
 a state controlling unit which controls the vehicle position transmission system from an operating state to a stand-by state upon detecting at least one condition indicating that an ignition switch or an accessory switch of the vehicle is switched from ON to OFF, and transmits a position signal from the wireless communication equipment to an outside equipment using a last opportunity before transiting the vehicle position transmission system to a sleeping state from the stand-by state upon detecting the at least one condition without receiving a request for the position signal from the outside equipment;
 wherein the operating state is a state in which the wireless communication equipment and other equipment group mounted on the vehicle other than the wireless communication equipment is capable of being controlled,
 the stand-by state is a state in which the wireless communication equipment is capable of communicating with the outside equipment but on the other hand the operation of the other equipment group is incapable of being controlled, and the supplied power to the vehicle position transmission system is lower than the supplied power thereto in the operating state, and is a state in which the vehicle position transmission system returns back to after temporarily transiting to the operating state in the case where the wireless communication equipment receives a request signal from the outside equipment, and
 the sleeping state is a state in which the wireless communication equipment is incapable of communicating with the outside equipment and also the operation of the other equipment group is incapable of being controlled, and the supplied power to the vehicle position transmission system is lower than the supplied power thereto in the stand-by state, and is a state in which the vehicle position transmission system is transited therefrom to the operating state in the case where the ignition switch or the accessory switch is switched from OFF to ON.

2. The vehicle position transmission system according to claim 1, wherein the state controlling unit recognizes a power supply ability of a power source which supplies power to the vehicle position transmission system, and sets the transition requirement of the vehicle position transmission system to the sleeping state on the basis of the power supply ability of the power source.

3. A vehicle position transmission system mounted on a vehicle, comprising:
a wireless communication equipment;
a position measuring unit which measures a position of the vehicle; and
a state controlling unit which controls the vehicle position transmission system from an operating state to a stand-by state upon detecting at least one condition indicating that an ignition switch or an accessory switch of the vehicle is switched from ON to OFF, and transmits a position signal from the wireless communication equipment to an outside equipment using a last opportunity before transiting the vehicle position transmission system to a sleeping state from the stand-by state upon detecting the at least one condition without receiving a request for the position signal from the outside equipment;
wherein the operating state is a state in which the wireless communication equipment and other equipment group mounted on the vehicle other than the wireless communication equipment is capable of being controlled,
the stand-by state is a state in which the wireless communication equipment is capable of communicating with the outside equipment but on the other hand the operation of the other equipment group is incapable of being controlled, and the supplied power to the vehicle position transmission system is lower than the supplied power thereto in the operating state, and is a state in which the vehicle position transmission system returns back to after temporarily transiting to the operating state in the case where the wireless communication equipment receives a request signal from the outside equipment,
the sleeping state is a state in which the wireless communication equipment is incapable of communicating with the outside equipment and also the operation of the other equipment group is incapable of being controlled, and the supplied power to the vehicle position transmission system is lower than the supplied power thereto in the stand-by state, and is a state in which the vehicle position transmission system is transited therefrom to the operating state in the case where the ignition switch or the accessory switch is switched from OFF to ON, and
the last opportunity indicates a communication frequency used between the wireless communication equipment and the outside equipment has reached a point immediately prior to the wireless communication equipment becoming incapable of communicating with the outside equipment.

* * * * *